United States Patent
Bodaghi et al.

(10) Patent No.: US 6,521,555 B1
(45) Date of Patent: *Feb. 18, 2003

(54) METHOD OF MAKING MEDIA OF CONTROLLED POROSITY AND PRODUCT THEREOF

(75) Inventors: Hassan Bodaghi, Great Neck, NY (US); Michael Kauschke, Rimsting (DE); Mordechai Turi, Princeton Junction, NJ (US)

(73) Assignee: First Quality Nonwovens, Inc., State College, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/496,687

(22) Filed: Feb. 2, 2000

Related U.S. Application Data (63) Continuation-in-part of application No. 09/460,661, filed on Dec. 13, 1999, which is a continuation-in-part of application No. 09/334,587, filed on Jun. 16, 1999, now Pat. No. 6,413,344.

(51) Int. Cl.[7] .............................. D04H 1/56; D04H 1/00; B32B 5/26; B32B 3/10
(52) U.S. Cl. ...................... 442/400; 442/334; 442/381; 442/382; 442/401; 428/131; 428/132; 428/137; 428/138; 156/167; 156/181; 156/296; 156/308.2
(58) Field of Search ................................ 442/334, 382, 442/400, 401, 381; 156/167, 181, 296, 308.2; 428/131, 132, 137, 138

(56) References Cited

U.S. PATENT DOCUMENTS

| | | |
|---|---|---|
| 4,112,159 A | 9/1978 | Pall |
| 4,526,733 A | 7/1985 | Lau |
| 5,075,068 A | 12/1991 | Milligan et al. |
| 5,080,569 A | 1/1992 | Gubernick et al. |
| 5,160,746 A | 11/1992 | Dodge, II et al. |
| 5,441,550 A * | 8/1995 | Hassenboehler, Jr. et al. ............... 55/486 |
| 5,607,701 A | 3/1997 | Allen et al. |
| 5,652,048 A * | 7/1997 | Haynes et al. ............... 442/351 |
| 5,804,286 A | 9/1998 | Quantrille et al. |
| 5,948,334 A * | 9/1999 | Takeuchi et al. ............... 264/83 |
| 5,964,742 A | 10/1999 | McCormack et al. |
| 5,993,943 A | 11/1999 | Bodaghi et al. |
| 5,997,989 A | 12/1999 | Gessner et al. |
| 6,001,303 A | 12/1999 | Haynes et al. |
| 6,176,952 B1 | 1/2001 | Maugans et al. |

FOREIGN PATENT DOCUMENTS

| | | |
|---|---|---|
| WO | WO 99/53877 | 10/1999 |
| WO | WO 99/57355 | 11/2000 |

* cited by examiner

Primary Examiner—Elizabeth M. Cole
Assistant Examiner—Jeremy R Pierce
(74) Attorney, Agent, or Firm—Amster, Rothstein & Ebenstein (57) ABSTRACT

A method of making a non-woven fibrous media, combining high vapor permeability and low liquid permeability, includes the steps of providing a non-woven fabric formed from fibers that are prematurely crystallized during fabric formation and have a wide heat of fusion range distribution, and calendering the fabric to soften the small polymer crystals therein of low heats of fusion, but not the relatively larger polymer crystals therein of relatively higher heats of fusion, thereby to retain high vapor permeability while providing low liquid permeability. The polymer is preferably isotactic polypropylene.

26 Claims, 8 Drawing Sheets

METHOD OF MAKING MEDIA OF CONTROLLED POROSITY AND PRODUCT THEREOF

CROSS-REFERENCE TO RELATED APPLICATION

This is a continuation-in-part of U.S. patent application Ser. No. 09/460,661, filed Dec. 13, 1999, itself a continuation-in-part of U.S. patent application Ser. No. 09/334,587, filed Jun. 16, 1999, now U.S. Pat. No. 6,413,344.

BACKGROUND OF THE INVENTION

The present invention relates to a method of making fibrous media of controlled porosity, a media having a controlled pore size and a narrow pore size distribution, and a media which combines high vapor permeability and low liquid permeability, and the products thereof.

It is well known to produce a laminate made from various polymers and textiles for use in a wide variety of product applications. For example, meltblown and spunbond materials afford a high level of vapor permeability and liquid permeability when used either by themselves or in combination with one another and/or other porous materials.

Meltblowing is a method for economically producing very small fibers which are mostly suitable for filtration and insulation applications. Fibers smaller than 1 micron in diameter may be produced by meltblowing, and the average fiber diameter in conventional meltblowing is about 4 microns, with fiber size distribution ranging from ¼ micron to 8 microns. To form such small fibers one must star, with polymer resins of very low molecular weight. In this process the nonwoven fabric is formed in one step from the polymer resin into the final meltblown nonwoven fabric. Meltblown fabrics are porous and, significantly, do not have either a controlled pore size or a narrow pore size distribution. Instead, pore size is random and non-uniform, such that a typical meltblown fabric will have a random distribution of pores of various sizes. A meltblown fabric having a controlled pore size and a narrow pore size distribution would have great utility in particular applications—filtration applications, for example. One embodiment of the present invention relates to a meltblown fabric having a controlled pore size and a narrow pore size distribution.

In contrast, spunbonding is very similar to conventional fiber spinning where several processing steps are required to form the spunbond fabric. Spunbond fibers go through a drawing stage and then a laydown stage wherein the drawn fibers are laid down into a matt and the matt is then bonded by a thermobonding calender or mechanical entangling to form the nonwoven fabric. The resins used in the spunbonding process have lower molecular weight than those used in the conventional melt spinning process and higher molecular weights than those used in the conventional meltblowing process. Fibers smaller than 10 microns in diameter are very difficult to produce economically by spunbonding, and the average fiber diameter for conventional spunbonding processes is about 18 microns.

However, for particular applications, such as those in the health care industry—e.g., infant diapers, sanitary pads, adult incontinence wear, medical surgical dressings, and the like—the product must perform three distinct functions: First, a front or top sheet intended to contact the patient's skin must allow the passage of moisture (e.g., blood, urine and like liquids) therethrough while at the same time providing an acceptable feel to the wearer's skin. Second, an absorbent core, intermediate the top sheet and the backsheet, must be capable of absorbing the moisture which has been received through the top sheet. Third, a backsheet, on the back of the absorbent core, prevents leakage of moisture outwardly of the laminate. Another embodiment of the present invention relates specifically to the backsheet component.

The barrier properties of the backsheet (i.e., the trapping of moisture and other liquids) are typically achieved by incorporating into the backsheet a plastic layer or film which acts as a moisture barrier. Various major disadvantages associated with the utilization of such barrier films are the low moisture vapor transmission rates (MVTR) of the barrier films, undesirable crinkling noise created by the barrier film during usage of the product, and a stiffening of the product (due to the barrier film) which reduces its conformability to the area to which it is applied.

Porous films are typically permeable to both liquid water and water vapor. They may bit made by the incorporation of different organic or inorganic additives into a polymer film, the film then being stretched or fillers removed therefrom chemically. Other conventional methods include mechanical perforation and/or radiation techniques to form the desired holes or slits in the polymeric film. Formation of uniform pore size in a film is very difficult, and porous plastic films are generally more expensive than non-wovens.

On the other hand, non-porous barrier films are typically impermeable to both liquid water and water vapor. As a result, using the impermeable film in a diaper backsheet, for example, makes the diaper hot before exposure to liquid (as the barrier film prevents air circulation) and clammy after exposure to moisture (because the barrier film precludes moisture evaporation). Indeed, the use of an impermeable barrier film in a diaper may cause severe dermatological problems, such as skin rash on infants, and skin sores on adults wearing such non-porous products.

It is also known to form a semi-porous barrier film of controlled porosity which is permeable to water vapor, but impermeable to liquid water—that is, breathable. However, the method of manufacturing such a microporous film of controlled porosity is typically complex and expensive, and requires a relatively specialized polymeric input (for example, conjugate fibers formed of two separately manufactures polymeric materials or laminates formed of two separately manufactured polymeric materials).

Clearly the need remains for a method of economically manufacturing a media of controlled porosity, and in particular a media of controlled porosity that includes high vapor permeability and low liquid permeability, without the use of chemical binders, additives or coatings. Such breathable media would find use in products which are sold in such quantity that any reduction in the cost thereof (e.g., which makes it sufficiently economical for manufacture for use in disposable products) is highly desirable.

Accordingly, it is an object of the present invention to provide a method of making of a media of controlled porosity.

Another object of the invention is to make a media of controlled porosity combining high vapor permeability and low liquid permeability.

Still another object is to provide such a method which does not require a specialized polymeric input.

A further object is to provide such a method which does not require the use of chemical binders, additives or coatings to provide the desired permeability or porosity.

It is also an object of the present invention to provide a material made by the aforesaid method.

It is another object to provide such a material which does not produce noise during use find which exhibits cloth-like feel (hand).

It is a further object to provide such a material which is economical to manufacture (e.g., for use in disposable products).

SUMMARY OF THE INVENTION

It has now been found that the above and related objects of the present invention are obtained in a method of making a non-woven fibrous media of controlled porosity, the method comprising the step of providing a non-woven fabric formed from fibers that are prematurely crystallized during fabric formation to form small polymer crystals therein having low heats of fusion and relatively larger polymer crystals therein having relatively higher heats of fusion. In a preferred embodiment, the fabric is a meltblown fabric formed from meltblown fibers.

The present invention also includes a method of making a non-woven fibrous media combining high vapor permeability and low liquid permeability. The method comprises the steps of providing a non-woven fabric formed from fibers that are prematurely crystallized during web formation and have a wide heat of fusion range distribution, and then calendering the fabric to soften the small polymer crystals therein of low heats of fusion, but not the relatively larger crystals therein of relatively higher heats of fusion, thereby to retain high vapor permeability.

The present invention additionally comprises a non-woven fibrous media providing a controlled porosity with a narrow pore size distribution and/or a non-woven fibrous media providing high vapor permeability and low liquid permeability. The media is a non-woven fabric formed from fibers that are prematurely crystallized polymer and have a wide heat of fusion range distribution. To achieve high vapor permeability and low liquid permeability, the fabric is then calendered to soften the small polymer crystals therein of low heats of fusion, but not the relatively large polymer crystals therein of relatively higher heats of fusion, thereby to retain high vapor permeability while providing low liquid permeability.

In a preferred embodiment the polymer is polypropylene, and optimally isotactic polypropylene, although other isotactic polymers may be used. The polymer is prematurely crystallized, preferably by quenching it prior to completion of fiber structural formation so that the polymer exhibits a bell-shaped heat of fusion range distribution (prior to calendering). Pore size is controlled by the speed of quenching. The faster the quenching, the smaller the pore size. The temperature, pressure and roller speed of the calendering operation are selected to soften the small polymer crystals, but not the relatively larger polymer crystals. For example, the fabric is preferably calendered at a temperature of about 25–110° C., a pressure of about 25–150 Newtons, and a roller speed of up to 200 meters/minute. The fabric is calendered to retain a moisture vapor permeability, of at least about 1200 g/m² @ 24 hours and to provide a hydrostatic head of at least about 10 millibars (about 100 mm H₂O). The calendered material may be made into a composite with, for example, at least one spunbond, spunmelt or other nonwoven fabric layer.

The present invention also relates in particular to three separate process modifications and the products thereof.

The first process modification is a method of making a fibrous media combining high vapor permeability and low liquid permeability. The method comprises the steps of providing a non-woven fabric formed from fibers that are prematurely crystallized during fabric formation to form small polymer crystals therein having low heats of fusion and relatively larger polymer crystals therein of relatively higher heats of fusion. The fabric is calendered to soften the small polymer crystals therein of low heats of fusion, but not the relatively larger polymer crystals therein of relatively higher heats of fusion, thereby to retain high vapor permeability while providing low liquid permeability. A laminate is formed of the calendered fabric and a non-woven, and the laminate is passed through an embossing station to impose a pattern of depressions and projections on the calendered fabric wherein the non-woven enters the depressions of the embossed calendered fibers. Preferably, the laminating station includes a heated hard roll adjacent the non-woven and an unheated soft roll adjacent the calendered fabric, and the calendered fabric retains after lamination a high MVTR and substantially no holes therein. Preferably, the non-woven is a spunbond.

The product of the first process modification is a non-woven fibrous media combining high vapor permeability and low liquid permeability. The media comprises a non-woven fabric formed from fibers that are prematurely crystallized during fabric formation to form small polymer crystals therein having low heats of fusion and relatively larger polymer crystals therein of relatively higher heats of fusion. The fabric is calendered to soften the small polymer crystals, but not thee relatively larger polymer crystals, thereby to retain high vapor permeability while providing low liquid permeability. The non-woven fabric is a component of a calendered laminate with a spunbond, the non-woven fabric having an embossed pattern of depressions and projections, with the spunbond entering the depressions of the non-woven fabric.

The second process modification is a method of making a fibrous media combining high vapor permeability and low liquid permeability. The method comprises the steps of providing a non-woven fabric formed from fibers that are prematurely crystallized during fabric formation to form small polymer crystals therein having low; heats of fusion and relatively larger polymer crystals therein of relatively higher heats of fusion. The prematurely crystallized fibers of the fabric are passed through an addition station where at least one polymeric addition material is deposited on the fibers. The fabric is then calendered to soften the small polymer crystals therein of low heats of fusion, but not the relatively larger polymer crystals therein of relatively higher heats of fusion, thereby to retain high vapor permeability while providing low liquid permeability, and to integrate the fabric and the addition material. Preferably, the fibers are polypropylene of a given diameter range, and the addition material is selected from the group consisting of polyethylene, polyurethane, ethyl vinyl alcohol, polypropylene of a different diameter range, and combinations thereof. Substantially each addition material is added at a respective separate addition station.

The product of the second process modification is a non-woven fibrous media combining high vapor permeability and low liquid permeability. The media comprises a non-woven fabric formed from fibers that are prematurely crystallized during fabric formation to form small polymer crystals therein having low heats of fusion and relatively larger polymer crystals therein of relatively higher heats of fusion. The fabric is calendered to soften the small polymer crystals, but not the relatively larger polymer crystals, thereby to retain high vapor permeability while providing low liquid permeability. The calendered fabric includes at least one polymeric addition material deposited on the fabric. Preferably, the at least one polymeric addition material is deposited on the fabric before or after calendering.

The third process modification is a method of making a fibrous media combining high vapor permeability and low liquid permeability. In one embodiment, the method comprises the steps of providing a non-woven fabric formed from fibers that are prematurely crystallized during fabric formation to form small polymer crystals therein having low heats of fusion and relatively larger polymer crystals therein of relatively higher heats of fusion. The fabric is calendered to soften the small polymer crystals therein of low heats of fusion, but not the relatively larger polymer crystals therein of relatively higher heats of fusion, thereby to retain high vapor permeability while providing low liquid permeability. The size of the pores in the calendered fabric is increased, and the pores in the calendered fabric are shaped so as to maximize strikethrough of bodily fluids and minimize rewetting. Preferably, the increasing and shaping step comprises hot needle perforation of the calendered fabric such that insertion of the hot needle plasticizes the calendered fabric thereabout and, upon withdrawal of the hot needle, allows freezing of the plasticized calendered fabric. In another embodiment, the method comprising the steps of providing a non-woven fabric formed from fibers that are prematurely crystallized during fabric formation to form small polymer crystals therein having low heats of fusion and relatively larger polymer crystals therein of relatively higher heats of fusion. A perforated rotating screen under suction is used to receive the fibers of the fabric and form enlarged and shaped pores therein to maximize strikethrough and minimize rewetting. The fabric is then calendered to soften the small polymer crystals therein of low heats of fusion, but not the relatively larger polymer crystals therein of relatively higher heats of fusion, thereby to retain high vapor permeability while providing low liquid permeability.

The product of the third process modification is a non-woven fibrous media combining high vapor permeability and low liquid permeability. The media comprises a non-woven fabric formed from fibers that are prematurely crystallized during fabric formation to form small polymer crystals therein having low heats of fusion and relatively larger polymer crystals therein of relatively higher heats of fusion. The fabric is calendered to soften the small polymer crystals, but not the relatively larger polymer crystals, thereby to retain high vapor permeability while providing low liquid permeability. The non-woven fabric defines enlarged and shaped pores to maximize strikethrough and minimize rewetting.

BRIEF DESCRIPTION OF THE DRAWING

The above and related objects, features and advantages of the present invention will be more fully understood by reference to the following detailed description of the presently preferred, albeit illustrative, embodiments of the present invention when taken in conjunction with the accompanying drawing wherein.

DETAILED DESCRIPTION OF THE PREFERRED EMBODIMENTS

Figure 1:
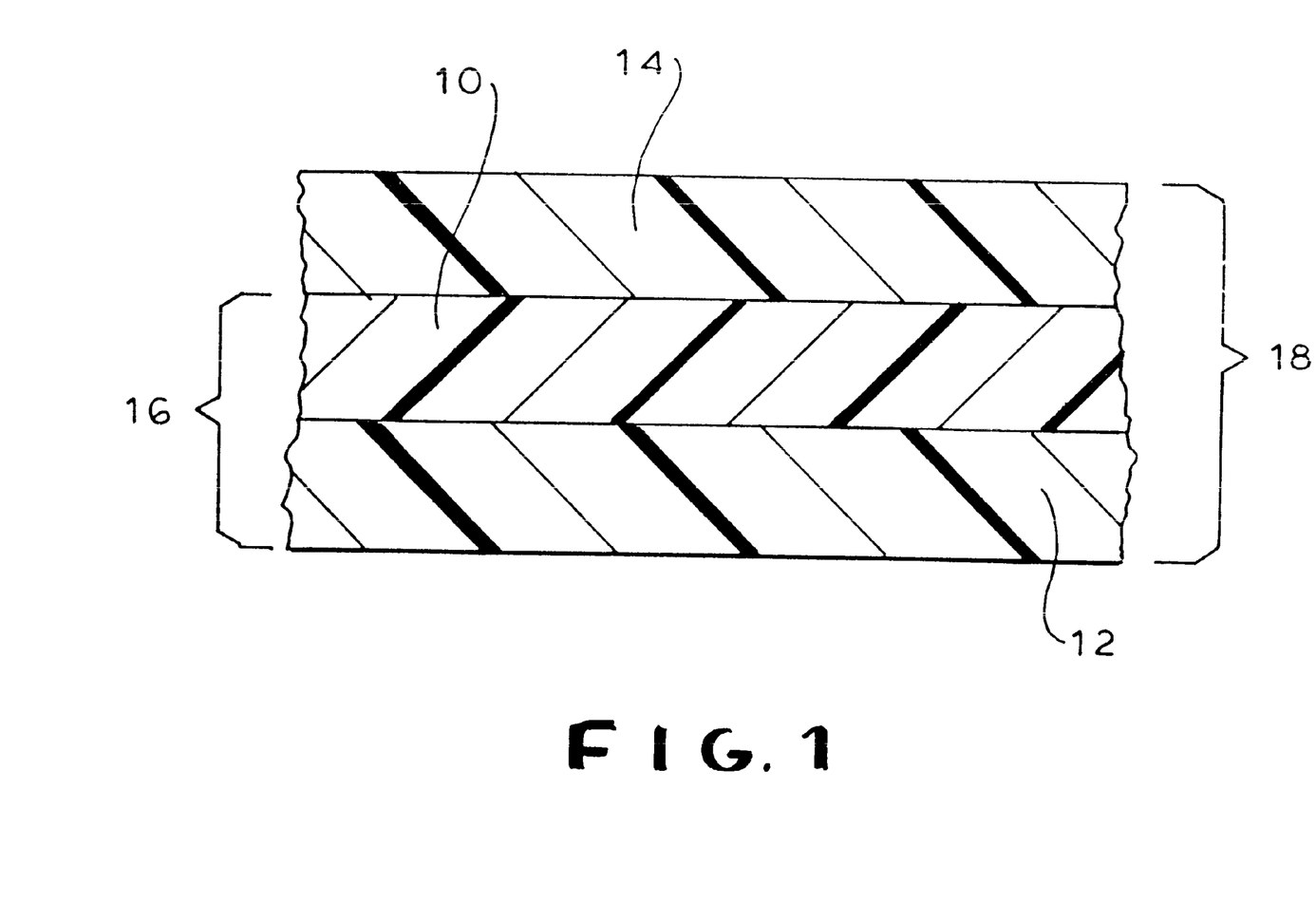
FIG. 1 is an isometric view of a fabric according to the present invention, laminated to a spunbond fabric, for use in a diaper.
Figure 2A:
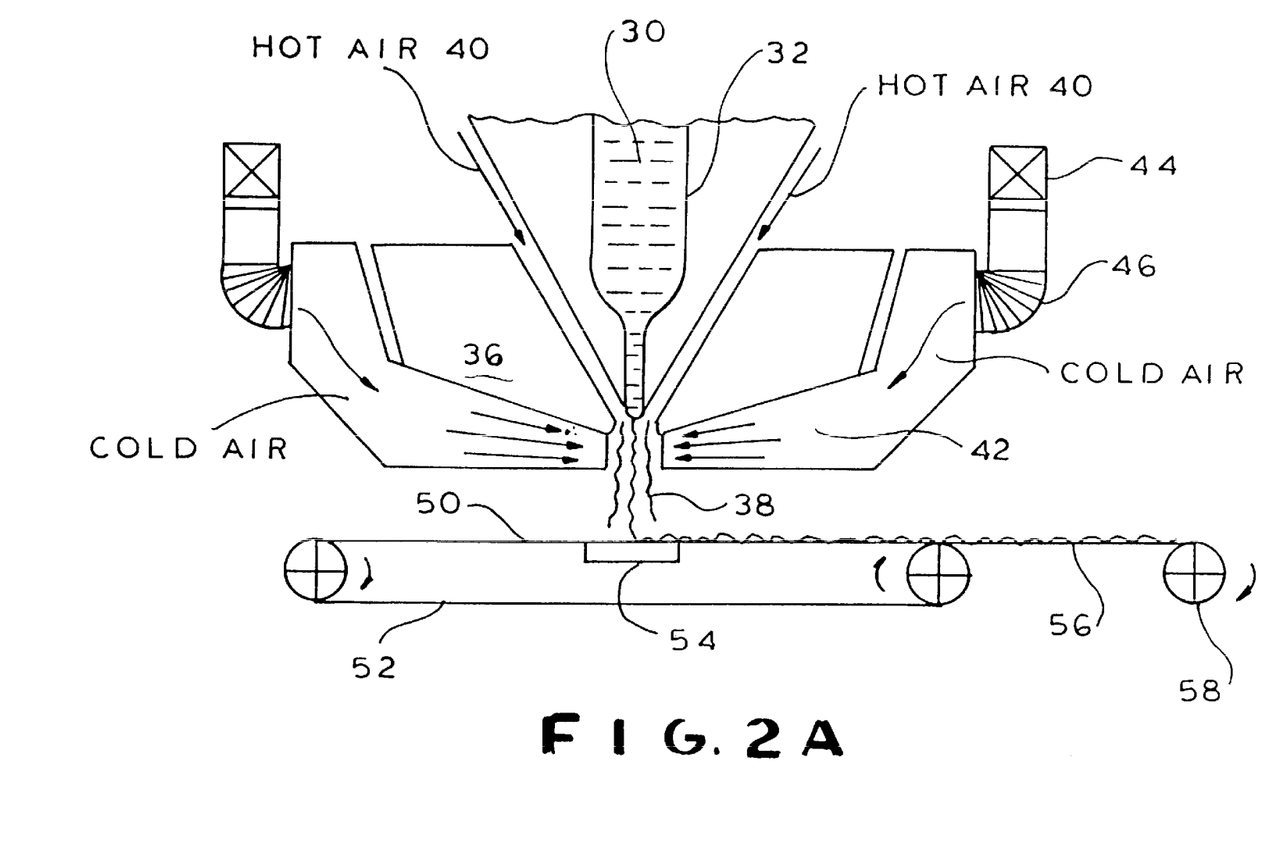
FIGS. 2A and 2B form a flow chart of a preferred method of making the fabric.
Figure 2B:
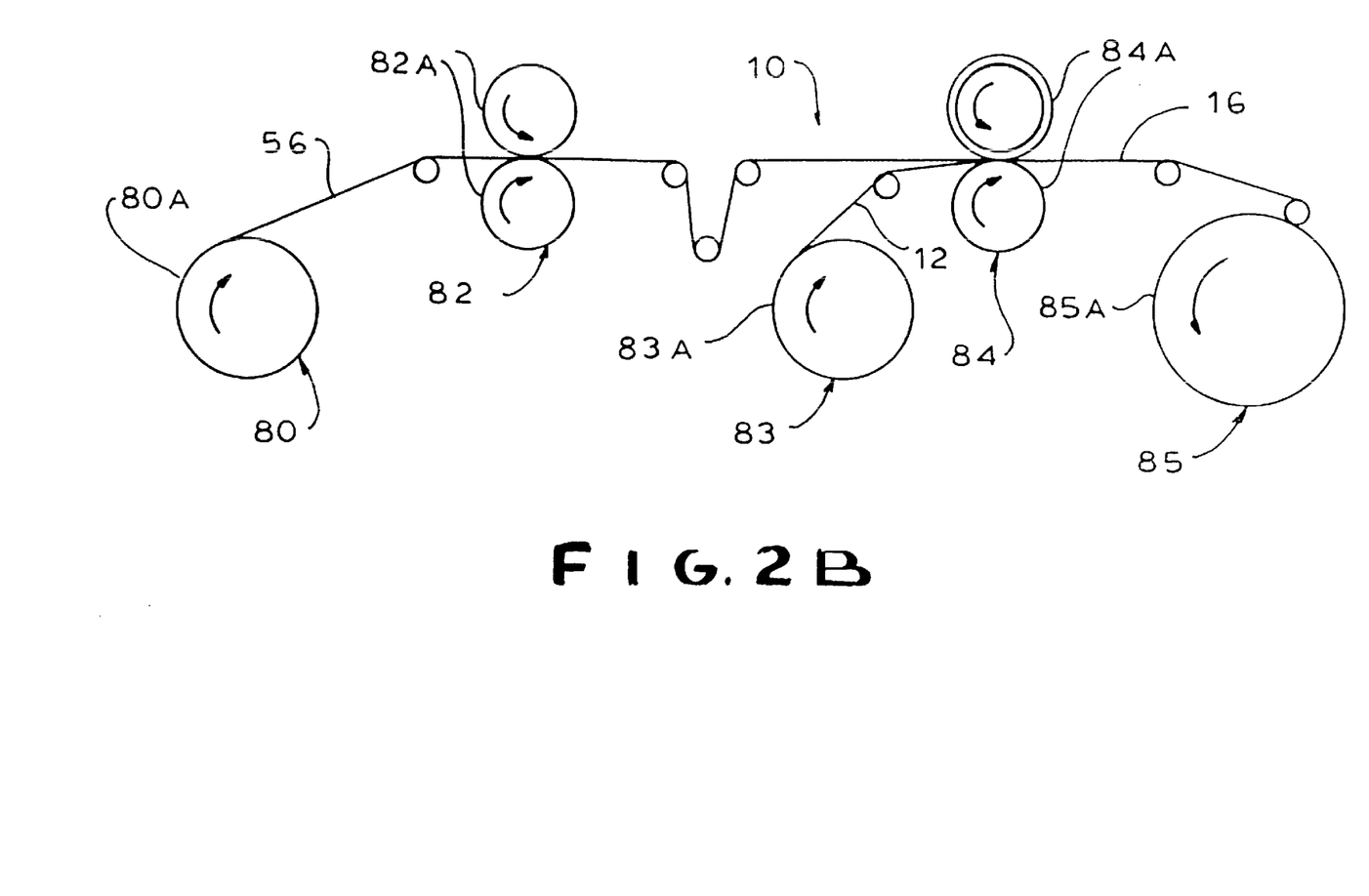

Referring now to the drawing, and in particular to FIGS. 1 and 2 thereof, the present invention relates to a method of making a non-woven fibrous media of controlled porosity, generally designated by the reference numeral 10, the media 10 optionally combining high vapor permeability and low liquid permeability. While for the purposes of the present invention, the media will be described as combining high water vapor permeability and low liquid water permeability, clearly the intended application of the media will dictate the specifics of these criteria—for example, whether the low liquid permeability applies to blood, bodily exudate or like liquids and whether the high vapor permeability applies to water vapor, air or like gases. Typically, the goal is a substantially water liquid impermeable and substantially water vapor permeable media. The optimum balance of properties can be tailored for individual applications.

The molten polymer from which the media will be made is preferably isotactic in nature so that it has a uniform structure over its polymeric chain length. Alternatively, however, syndiotactic polymer may be used in particular applications where the uniformity of the structure is of lesser importance. Atactic materials are not suitable for the purpose of the present invention since the structure thereof is so irregular over its polymeric chain length that they strongly resist crystallization. Polyolefins are preferred for use as the polymer, polypropylene being especially preferred. Thus, the preferred polymer for use in the present invention is isotactic polypropylene.

Typically, pellets or other conventional forms of the polymer suitable for handling within a manufacturing plant are placed in the hopper of a spinnerette and melted through an extruder. Once molten, the polymer is forced (extruded) through a spinnerette die defining small nozzles through which the molten polymer passes, thereby forming fibers as the polymer cools. For ease of processing, the polymer preferably has a very high melt flow level rate and is collected from tile spinnerette die at very close die-collector distances. While the non-woven fabric is preferably a meltblown, it may also be a spunbond or other non-woven fibrous media to the extent that a suitable fabric is produced.

It is a feature of the present invention that the fabric be formed from fibers that are prematurely crystallized during fabric formation. Such prematurely crystallized fibers exhibit a "smectic" crystalline structure. A smectic crystalline structure contains both small polymer crystals of low heat of fusion and relatively larger polymer crystals of relatively higher heats of fusion. The smectic crystalline structure is also referred to as "paracrystallinity."

The smectic or prematurely crystallized nature of the fibers useful in the method of the present invention can be achieved in a variety of different ways. The most common technique is to quench the fibers emerging from the spinnerette die (e.g., with a cold gas or liquid, such as air at or below 23° C. or ambient temperature) before all of the polymer crystals in the fibers have grown to their full extent. As a result, the quenched fibers will contain small polymer crystals of low heats of fusion and relatively larger polymer crystals of relatively higher heat suffusion. In other words, prematurely crystallized fibers exhibit a wide range distribution of the heats of fusion.

That the quenched polymer fibers exhibit a relatively wide heats of fusion distribution is evidenced by the relatively broad bell-shaped curve distribution observed in the DSC (Differential Scanning Calorimeter) data therefor. To obtain the DSC data, the polymer fibers are heated from 30° C. to 300° C. at a temperature increase rate of 10° C./minute. The heat of fusion data is plotted in FIGS. 6A and 6B as heat of fusion (Heat Flow Endothermic Up) in milliwatts versus temperature in ° C. The "area" under the curve represents the amount of heat absorbed, and the "ΔH" represent the heat of fusion.

Figure 6A:
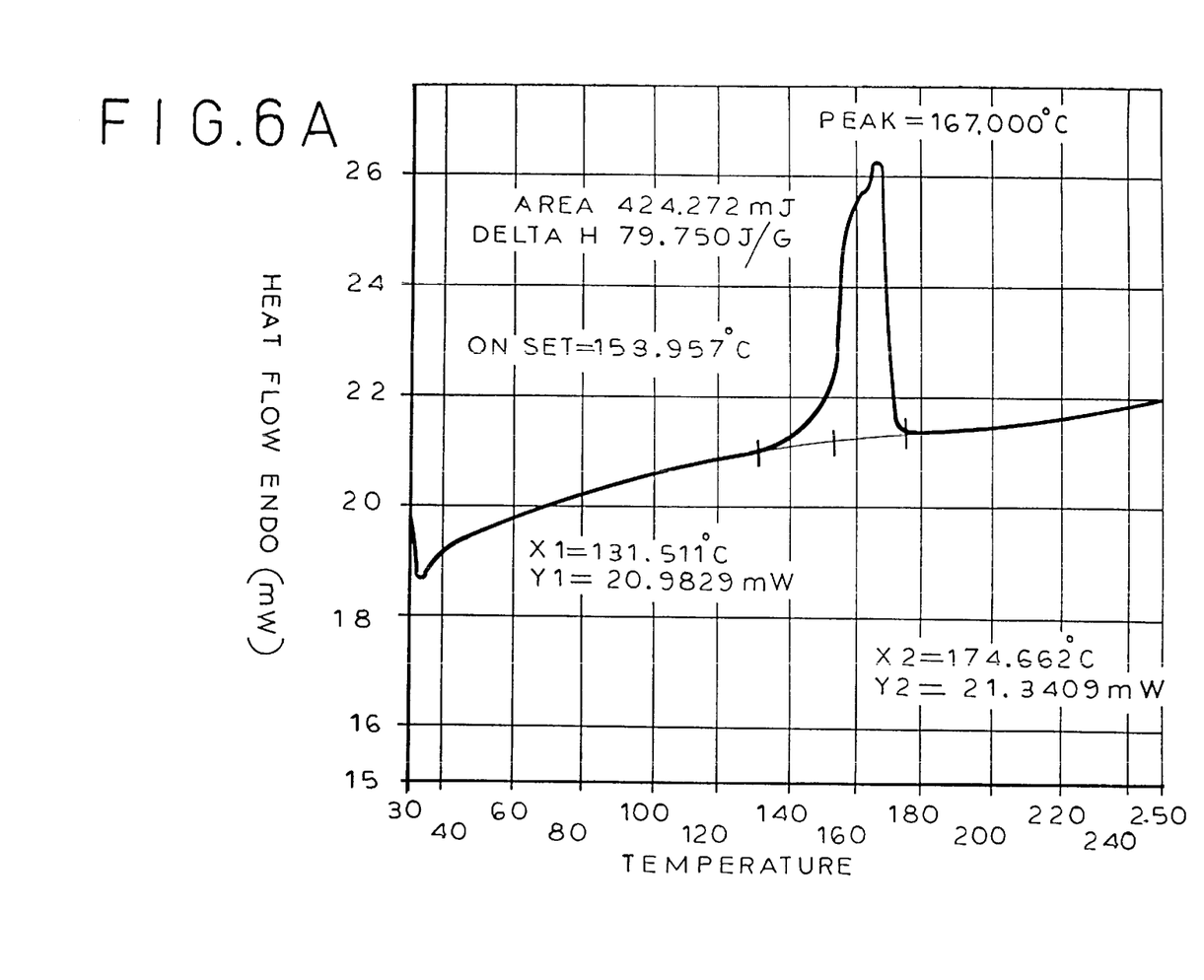
FIGS. 6A and 6B are DSC curves for a quenched meltblown and a non-quenched meltblown, respectively.
Figure 6B:
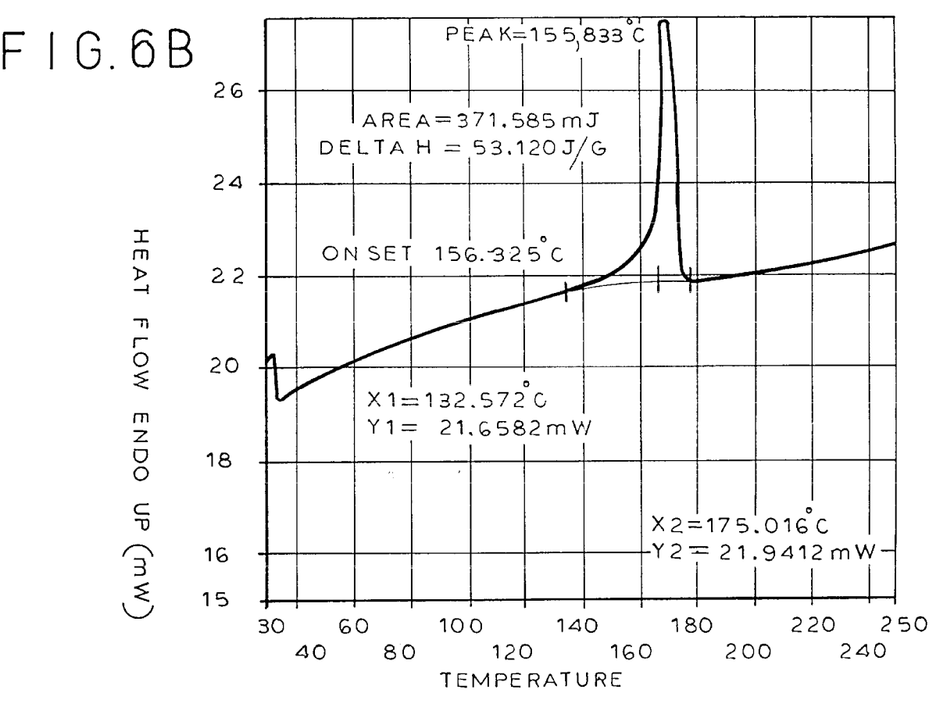

As seen in FIG. 6B, typically a non-quenched polymer (100% polypropylene) exhibits a narrow heat of fusion range distribution peak, indicating that all the polymer crystals thereof are of roughly the same morphology—i.e., have comparable heats of fusion so that they all soften at the same temperature. By way of contrast, smectic polymer contains some polymer chains that are highly crystallized and other polymer chains that are less highly crystallized. As a result, as seen in FIG. 6A, the smectic polymer (100% polypropylene) of the present invention typically exhibits a relatively wide range of heats of fusion, as evidenced by the relatively broad bell-shaped curve distribution (as opposed to the narrow peak distribution of non-smectic polymer). Indeed, the DSC curves for a smectic polymer typically indicate two peaks, a major peak and a minor peak within the major peak, while the DSC curves for a conventional non-smectic polymer exhibit only a single peak.

The data in TABLE III shows that the quenched polymer fibers of Sample 1 exhibit a sharply reduced air permeability relative to non-quenched like polymer fibers of Sample 2. For a 100% polypropylene fiber, the air permeability of the unquenched fiber (Sample 2) is 193, while the air a; permeability for the quenched fiber (Sample 1) is reduced to 83. A similar reduction in permeability ii; obtained for fiber blends.

At this juncture, it should be appreciated that the distinction between the small polymer crystals and the relatively larger polymer crystals in the smectic material reflects, not a difference in the molecular weights of the polymer crystals (i.e., the degree of polymerization thereof), but rather a difference in the morphology of the polymer crystals themselves. Typically the molten polymeric material which is passed through the spinnerette has polymer chains of generally the same molecular weight. Even where the pellets themselves are characterized by a wide molecular weight range, the initial processing thereof by heat find pressure in the spinnerette hopper acts to make them of a generally uniform molecular weight. Rather the "smectic crystallization" (or the "premature crystallization" or "supracrystallinity"), as applied to the present invention, relates to the morphology of the polymer crystals.

While various techniques may be used to achieve the premature crystallization of the fibers, it is most easily and economically achieved by rapid quenching of the fibers by liquid or gas cooling as the fibers leave the die of the spinnerette and approach the web of the collector. With the exception of the premature crystallization of the fibers during fabric formation, the production of the non-woven fabric according to the present invention is conventional in nature, and typically reflects well known non-woven fabric production techniques, especially those used in the production of meltblown fabrics. The quench temperature at which the molten filaments are quenched will depend, to some degree, on the composition of the molten polymer 30. For isotactic polypropylene a quench temperature of 23° C. or below is preferred.

The non-woven fabric thus produced is then calendered to compact the same. The roll surface temperature, roll surface pressure and roll speed of the calender are Selected so as to soften the small polymer crystals (of relatively low heats of fusion), but not the relatively larger polymer crystals (of relatively higher heats of fusion), thereby to retain high vapor permeability while providing low liquid permeability. For example, a preferred smectic polypropylene meltblown fabric is calendered at a roll surface temperature of about 25–110° C., a roll surface pressure of 25–150 Newtons, and a roll speed of up to 200 meters per minute to form a medium 10 of the present invention.

Roll speeds in excess of 200 meters per minute typically do not provide adequate time for heating of the fabric passing through the calender nip. On the other hand, roll speed should be maintained at as high a level as possible in order to provide increased production rates.

Generally speaking, as the pressure and temperature of a calendering operation are increased, the crystallinity of the resultant medium (as measured by the increase of the area under the peaks of a DSC curve) also increases. If the temperature and pressure applied by the calendar are too low (or the roll speed too high), then the undercalendered meltblown fabric retains its high porosity to both liquid and gas and cannot act as a barrier sheet. If the temperature and pressure of the calender are too high (or the roll speed too low), then the overcalendered meltblown fabric is converted into a film which is totally impermeable to both gas and liquid (and noisy in use as well). Clearly, the optimum temperature, pressure and roll speed will depend on the nature of the particular smectic polymer being processed. While the degree of vapor permeability and liquid in permeability (hydrohead) will vary with the particular intended application of the product, typically a substantially complete liquid impermeability (even at a hydrostatic head of at least about 10 millibars) and a substantial complete vapor permeability (that is, a vapor permeability of at least about 1200 $g/m^2$ @ 24 h) are preferred.

The preferred pressure and temperature parameters for the compacting step may be easily and rapidly determined for any quenched material by holding one of the temperatures and pressures variables constant, while varying the other variable. Generally, the higher compacting temperatures are required in order to obtain air permeabilities and MVTRs within the preferred range, and the higher compacting pressures are required to obtain higher hydroheads.

It will be appreciated that air permeability and moisture vapor transmission rates are not necessarily related. Air permeability is closely related to the compactness of the material being measured and its resistance to air flow therethrough, while MVTR is more related to the morphology of the material being measured and its resistance to moisture vapor transmission flow. Nonetheless, as a practical matter, air permeability measurements may be taken as indicative of MVTR measurements, subject to correction as necessary, where, for example, the MVTR measuring equipment is unavailable and the air permeability measuring equipment is available.

It is theorized that during calendering the small polymer crystals (with low heats of fusion) soften and act as a binder between the unsoftened larger polymer crystals (with high heats of fusion). It is theorized that the softening of the small polymer crystals allows them to close the pores between the large polymer crystals, thereby shrinking the fabric and forming a vapor permeable, liquid impermeable non-woven barrier medium. The calendering effects fiber shrinkage and contraction in the media, thereby closing the large liquid-bearing channels or pores therethrough while leaving open the relatively smaller vapor-bearing channels or pores therethrough.

The optimum balance of properties can be tailored for particular applications.

It will be appreciated by those skilled in the art that the term "calender," as used herein, encompasses all means to perform both heat transfer and compacting (that is, heating and reducing the thickness of a fabric). While a set of calender rolls is the most common mechanism for performing these operations, other mechanisms may be used instead or in addition thereto.

The media 10 is characterized by a hydrohead of at least about 10, and preferably at least 20 millibars, an MVTR of at least about 1200, and preferably at least 3000 g/m$^2$ @ 24 h, and an air permeability of about 0.1–100, and preferably 0.4–3 cfm. The laminated composite 16 (formed of the media 10 and a spunbond fabric 12) suitable for use as a backsheet in a diaper or other absorbent product, has a hydrohead of at least about 20, and preferably 30 millibars, an MVTR of at least about 2000, and preferably 4000 g/m$^2$ @ 24 h, and an air permeability o)f about 0.05–3, and preferably 0.1–1 cfm. These criteria are set forth in Table A below.

TABLE A

|  | HYDROHEAD mbr | MVTR g/m$^2$ @ 24 h | AIR PERMEABILITY cfm |
|---|---|---|---|
| Media | ≧10 (≧20) | ≧1,200 (≧3,000) | 0.1–100 (0.4–3) |
| Composite | ≧20 (≧30) | ≧2,000 (≧4,000) | 0.05–3 (0.1–1) |

Legend: (__) = preferred values

With regard to the data of Table A, it will be appreciated that the upper limits on the air permeability exists because, if material has too high an air permeability, it will probably leak liquid as well as air. While there is no upper limit set for the moisture vapor transmission rate (MVTR), it is generally preferred that the MVTR not be so high as to produce a clammy feeling or chill due to a rapid evaporation of the water.

No upper limits are given for the hydrohead because, as a practical matter, no liquid permeability is desired, regardless of the amount of pressure being exerted on the liquid trapped by the media and/or composite. When the media and/or composite is used as the backsheet of an infant diaper, the pressure exerted thereon (that is, primarily the weight of the infant) will be minimal so that the indicated minimal values of the hydrohead for the media/composite are acceptable. On the other hand, when the media/composite is used as the backsheet of an adult diaper or an adult incontinence pad, clearly a much higher hydrohead is required to prevent the escape of liquid under the weight of the adult. Thus, for example, hydroheads of 120 millibars would be the minimum for a backsheet of an adult diaper intended for use by a 180 lb. person. It will be appreciated that the infant/adult difference will also play a role in the quantity of moisture (i.e., urine) which must be allowed to escape as moisture vapor, depending upon the size and health of the kidneys of the wearer. The MVTR rates set forth are appropriate for the accommodation of both infants and adults.

The products of the invention are characterized by a relatively high tensile strength (both MD and CD) relative to competitive products. A medium 10 according to the present invention was laminated on one side to a conventional spunbond fabric 12 and on the other side to a conventional meltblown fabric 14, to form a fabric 18 as illustrated in FIG. 1. The sample thus prepared had a hydrohead of 164 millibars and a moisture vapor transmission rate (MVTR) of 4411 g/m$^2$/@24 h. In practical terms, the specimen exhibited essentially no liquid leakage and a very high moisture vapor permeability relative to other commercial diaper backsheet specimens of comparable basis weight.

Referring now to FIG. 2 in particular, FIG. 2A illustrates the formation of a thermally sensitive meltblown smectic web and FIG. 2B illustrates the compacting of the web and the optional lamination thereof to form an SM laminate 16.

Referring now to FIG. 2A in particular, the molten polymer 30 is extruded through a spinnerette or die hole 36 to form filaments 38. At the same time, hot air 40 is directed into the die body and emerges close to the filaments 38 being formed (adjacent the spinnerette) to draw the molten filaments 38. The molten filaments are then immediately quenched via chilled air 41 (for example, at about or below 23° C. or ambient temperature) as they are fed into a quenching unit 42 via a fan 44 and piping 46 so that the drawn filaments 38 are prematurely quenched by the cold air, thereby resulting in the formation of a material containing both small polymer crystals and large polymer crystals. The prematurely quenched filaments 38 then fall onto a collector 50 comprised of a roll or a conveyer belt 52, under the influence of gravity and/or a suction box 54, to form a thermally sensitive meltblown smectic web 56. The meltblown web 56 is eventually collected on a take-up roll 58 for storage or used immediately in the next step of the process. The meltblown web 56 is a media of controlled porosity and optionally combines high vapor permeability and low liquid permeability. Such materials find utility as filters in a variety of different applications, and the like.

Referring, now to FIG. 2B in particular, a thermally sensitive meltblown smectic web 56 is unwound from a supply drum 80A thereof at the unwinding station 80. The web is then passed through a compacting station 82. The compaction calender 82A of compacting station 82 has two rolls. The top roller has a smooth steel outer surface and thermal oil heating so as to provide a controlled temperature at the calender nip. The bottom roll is made of a softer material as compared to steel (e.g., a polyamide available under the trade name RACOLON) which make the media softer during compacting and prevents possible pinholes as the media gets thinner. The simultaneous heating and compression of the fabric fibers by the compaction calender 82A imparts liquid impermeability (barrier properties) to the medium of the present invention while retaining, at least to some degree, the gas permeability (breathability) thereof. The calendering effects fiber shrinkage and contraction in the media, due to the heat effect of calendering) thereby closing the large liquid-bearing channels or pores therethrough while leaving open the relatively smaller vapor-bearing channels or pores therethrough. The output of compacting station 82 is a media 10 according to the present invention.

However, to enhance the strength and feel thereof, the media 10 is typically laminated together with at least one spunbond, spunmelt or other nonwoven fabric on one side thereof, and optionally a meltblown or second spunbond, spunmelt or other nonwoven fabric on the other side thereof. Thus, at unwinding station 83 a spunbond material 12 is unwound from a supply drum 83A thereof. The compacted meltblown media 10 and the spunbond material 12 are laminated together at a laminating station 84 by a lamination calender 84A to form a laminate 16. The lamination calender has a rubber-covered steel roll adjacent the media and an engraved roller adjacent the spunbond material.

Other materials with which the media 10 may be laminated include cellulosic fibers (paper pulp), synthetic fibers, and even woven textiles.

Special roll combinations in the laminating station 84 may be used to affect the strength and textile-like softness (hand) of the final product, as well as adding desirable patterns to the fabric for aesthetic reasons. Preferably, the final product 16 (or 18 if a third layer is added) has a cloth-like feel combined with high tensile and related strength characteristics. The textile-like characteristics of the medium 10 are especially desirable where the fabric is used alone, although they may also be desirable when the medium 10 is used as an outer layer of a laminate.

In take-up station 85, the composite output 16 of lamination station 84 is wound oil a take-up roll 85A.

In the description above and the examples below, the important variables were determined using internationally accepted tests as follows:

HydrohE ad: EDANA-ERT-160-89
Air Permeability: EDANA-ERT-140.1-81
Mechanical (Tensile) Properties: EDANA-ERT-20.2-89
Basis Weight: EDANA-ERT-40.3-90
MVTR: ASTM-E96E

EXAMPLES

Example I

In order to establish the porosity of a medium according to the present invention, a diaper backsheet made with a preferred product of the present invention was compared with the backsheets of several competitive commercial diapers, with the results provided below in Table I.

The backsheet product of the present invention (labeled "FQF" in TABLE 1) was a SMM fabric containing on one side 10 g/m$^2$ of spunbond fabric, in the middle 10 g/m$^2$ of smectic media compacted according to the present invention, and on the other side 10 g/m$^2$ of uncompressed meltblown fabric, for a total of 30 g/m$^2$. It was tested against diaper backsheets used in competitive commercial diapers available under the trade names HUGGIES/ULTRATRIM, HUGGIES/SUPREME, PAMPERS/PREMIUM and DRYPERS/SUPREME.

All specimens were tested for hydrohead, MVTR, tensile strength (MD and CD) and percent elongation (MD and CD), and the data recorded in TABLE I.

The measurement of MVTR was accomplished by monitoring the amount of distilled waiter that evaporated through the specimen over a 24 hour period. The temperature of the water was maintained at 38° C. by using a constant temperature bath in which the jars of water were placed. A fan was used to maintain a constant air flow over the specimen. The height of the liquid was such that it did not interfere with the measurement as the top of the liquid was sufficiently above the bottom of the specimen.

The data of Table I shows that the hydrohead of a diaper backsheet made with the media according to the present invention (164) was second only to the Pamper/Premium (192), and that the MVTR and percent elongation thereof (MD and CD) according to the present invention (164) exceeded all others. The tensile strength (MD and CD) of the media composite according to the presents invention were comparable to those of the competitive products.

The data illustrate that a backsheet incorporating the media of the present invention as the barrier layer is comparable, or superior, to competitive products in all pertinent respects and, in particular, is greatly superior with respect to MVTR. Indeed, the MVTR of a backsheet according to the present invention is at least twice as high as the MVTR of the backsheets of the commercial products tested.

Example II

Three specimens were prepared from identical polypropylene pellets useful in the present invention. The first specimen was processed according to the present invention, including quenching and compacting. The second specimen was processed in the same manner, except that the quenching step and the compacting step were omitted. The third specimen was similarly processed, but with the quenching step being included and only the compacting step being omitted. The fourth and fifth specimens were similarly processed, but with the compacting step being included and only the quenching step being omitted. The fourth specimen was compacted at 75 N and 100° C., while the fifth specimen was compacted at 150 N and 110° C.

Pertinent data was collected at various points in the processing as reported in TABLE II below.

As might be expected, the material of specimen 2, a common meltblown, exhibited an air permeability of about 193 cfm, higher than the 100 cfm upper limit of acceptability. Similarly, the material of specimen 5, quenched and compacted at a high temperature, was a rigid, brittle film exhibiting a low hydrohead of 8 mm H$_2$O, relative to the lower limit of 10 mm H$_2$O for acceptability. Specimens 3 and 4 exhibited relatively high air permeabilities (83 cfm for specimen 3 and 36 cfm for specimen 4) such that they were within the limit for media according to the present invention as broadly defined (0.1–100 cfm), but substantially higher than the preferred limit (0.4–3 cfm). Further specimen 4 exhibited an unacceptably low MVTR, while specimens 3 and 5 were so porous to moisture vapor as to be out of the range of the available MVTR tester used.

The data illustrate that the quenching step alone or the compacting step alone are insufficient to produce a preferred medium according to the present invention. A preferred medium according to the present invention results only when both the quenching step and the compacting step are both performed.

While both the quenching step and the compact step are required to produce a preferred medium according to the present invention, the quenching step alone suffices to produce a media having a controlled pore size and a narrow pore size distribution. Indeed, such a media may combine high vapor permeability and low liquid permeability.

The colder the quenching air and/or the faster the quenching, the smaller the resulting pore size within the media, as the smaller crystals enable the larger crystals to fit closer together, with the resultant smaller pore sizes being formed by the combination of small and large crystals. In this connection, it will be appreciated that the smaller polymer crystals invade the large pores formed by the large polymer crystals so that the effective size of the pores is decreased—that is, there are more pores per unit volume due to the presence of the small polymer crystals as well as the large polymer crystals.

It will be appreciated that the unquenched and uncompacted material exhibits large pores which may be of sufficient size to allow passage therethrough of both water and water vapor. On the other hand, when the material is quenched (even though not compacted), the material shrinks under the temperature differential (from extrusion temperature to quenching temperature) and the pores shrink in size, often enough to eliminate water passage therethrough and in extreme circumstances to limit the passage of water vapor (moisture) therethrough. Finally, when the material is both quenched and compacted, the pore size is further diminished so that the pores pass a limited amount of water vapor, but no water.

The pore sizes of the uncompacted material may be measured by the permeability of the material, increasing permeability indicating increasing pore size and decreasing, permeability indicating decreasing pore size. See TABLE III.

The products of the present invention find utility in the healthcare industry, as discussed previously, as well as such diverse fields as clean room and health care gowns, clean room filters, house wraps, sterile packaging, battery separators and other industrial applications with barrier requirements which can be met by the product of the present invention.

For those applications which require a more elastomeric and more drapable media, without any change in the barrier properties or other advantages of the present invention, the molten polymer from which the media of the present invention is preferably made from a blend of 60–90% polypropylene and 10–40% polybutylene by weight. Media made from such a blend exhibit a higher elongation to break and are much more drapable as compared to those made from 100% polypropylene. Since such media are more elastic and behave more like rubber, laminates using such media exhibit lower noise (that is, less crinkling). A preferred polybutylene for use in the present invention is available finder the trade name PB DP 8910PC from Montell Chemical Co.

It will be appreciated by those skilled in the art that the hydrohead test is of a static nature and measures only the ability of the barrier media to withstand a water pressure gradually applied thereto; this is sufficient for many applications. However, certain applications require a more dynamic test to determine the capacity of the barrier media to withstand an impact suddenly driving the water thereagainst. The dynamic liquid impact test mimics the dynamic load/area (energy) that a baby will impart to a saturated core/backsheet structure when abruptly going from a standing to a sitting position. The dynamic liquid impact (in g/m²) is calculated based on the impact energy that an average 20 lb. baby will impart to a saturated diaper if the baby "falls" onto it from a standing position. The baby is modeled as two rigid links of known mass and length, and the assumption is made that the links "fall" from rest, with the impact area being the region under the diaper. This works out to be approximately 20 Joules (14.75 ft.-lb.) over an average baby "seat" area of 13.5 in.² or about 2300 J/m². Dynamic liquid impact was measured according to a proprietary Dynamic Liquid Impact Test Method V-L-35 of Proctor & Gamble.

A single layer of non-porous film alone gives a test result of 0 g/m². A single layer of laminate using a media according to the present invention gives a test result of 547 g/m². A sample of two layers of such laminate gives a test result of 375–465 g/m².

For a diaper backsheet, test results of less than 700 g/m², preferably less than 550 g/m², are acceptable on a 30 gsm laminate sample consisting of a spunbond layer (10 gsm), a central layer of media according to the present invention (10 gsm), and a meltblown layer (10 gsm) laminate.

Thus, the media of the present invention exhibits acceptable test results on a dynamic impact liquid test. The dynamic impact liquid test results confirm that the media of the present invention is the limiting factor.

A sample made of two laminates (for example, each laminate having the media of the present invention in the center, a spunbond on one side thereof, and a meltblown on the other side thereof) typically exhibits a lower dynamic impact liquid test level than a sample made of a single laminate alone. It is theorized that this is due to the increased calendering of the media layers in the laminate affecting he morphology of the test material.

The materials of the present invention, as discussed hereinabove, may be even further improved through the use of the process modifications described hereinbelow. The first process modification enables embossing of a meltblown material, without the danger of tearing it, the meltblown material being part of a meltblown/spunbond sandwich. The second process modification enables the production of a compacted blend of materials including the compacted meltblown material, without the operational problems typically encountered in mixing a variety of polymers in a single hopper and without the resultant bottleneck in the production line. The third process enables perforation of time meltblown material so that it is useful as a cover or top sheet characterized I.)y a high strikethrough of bodily fluids and a low level of rewetting. Each process modification will be described separately hereinbelow.

Typically, meltblown materials are not embossed or patterned (especially when used in oil absorption, sound absorption or thermal insulation applications) because the meltblown material is by itself too delicate for the embossing operation, arid any attempt to emboss or pattern it will result in pinholes (and possibly larger holes) being formed therein. By way of contrast, spunbond materials are stronger (because the filaments are already bonded together by passage through a set of rolls) and may even be used as a carrier to support a meltblown material.

Figure 3:
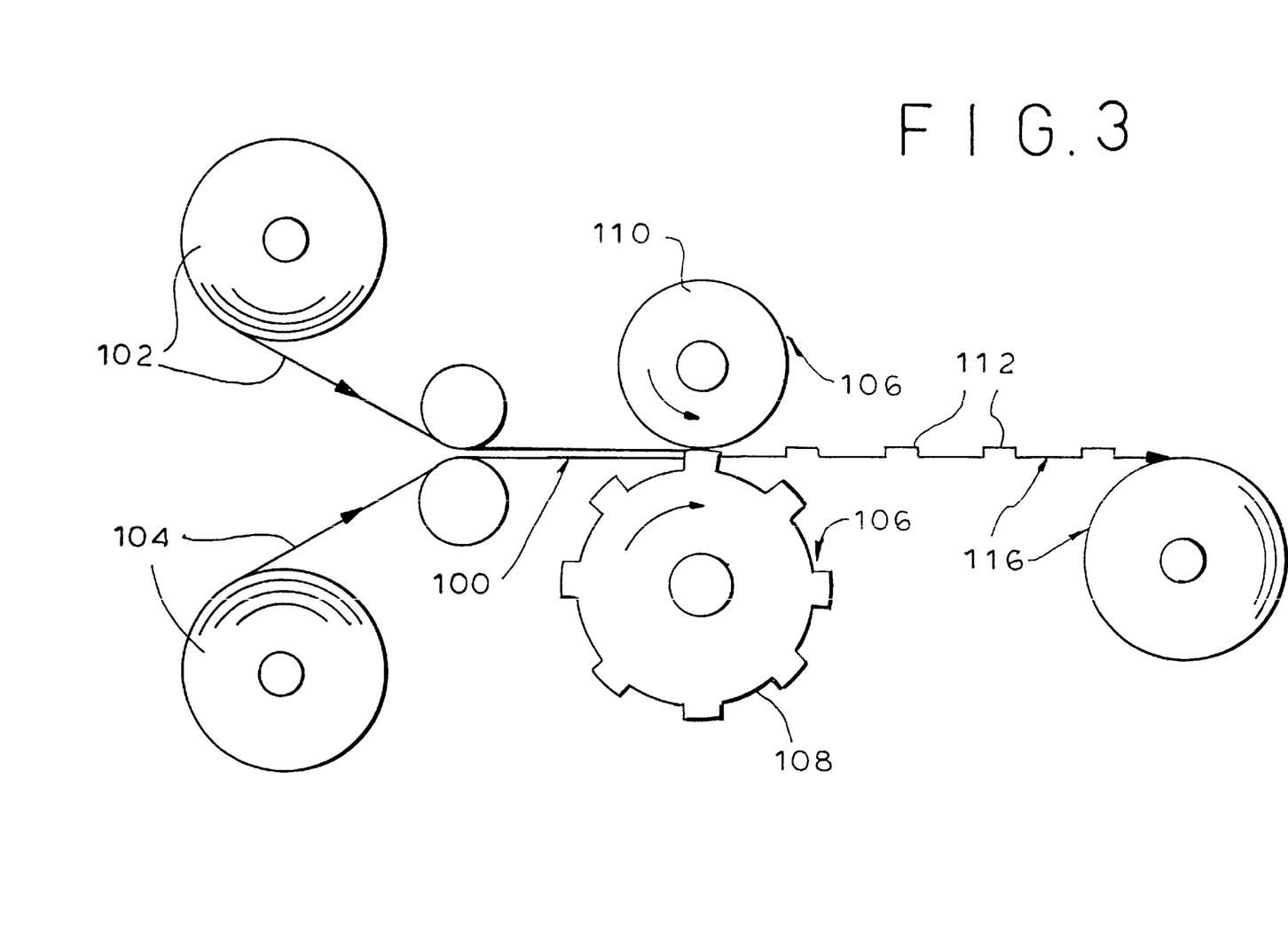
FIG. 3 is a schematic side elevational view of the process of embossing or patterning a compacted meltblown/spunbond material of the present invention to form an embossed laminate.

Referring now to FIG. 3, it has now been found that in the first process modification a sandwich, generally designated 100, of the compacted meltblown material 102 of the present invention and a spunbond material 104 may be embossed in such a way as to prevent hole formation in the meltblown material during the embossing operation. As the sandwich 100 passes through the embossing station, generally designated 106, the meltblown material 102 (with its lower melting point) softens before the spunbond material 104 (with its higher melting point). This occurs, even though the spunbond material 104 is preferably adjacent the heated hard roll 108 of the lamination station 106 and the meltblown material 102 is preferably adjacent the unheated soft roll 110.

In order to enhance the visual appearance and/or tactile feel of the meltblown media 102 of the present invention, a textile or non-woven material (preferably a spunbond 104 ) is laid onto the traveling compacted meltblown material 102. The sandwich 100 of the compacted meltblown material 102 and the added spunbond material 104 is then optionally passed over a preheating roll (not shown) which brings the two materials closer to the lamination temperature Thereafter, the sandwich 100 of the two materials 102, 104 is passed through a lamination station 106 which uses heat and/or pressure to impose a pattern on the materials. The lamination station 106 typically includes a heated hard roll 108 (typically formed of steel) and a non-heated soft roll 110 (typically formed of a material softer than steel, such as nylon, rubber, or the like). Preferably the heated hard roll 108 is disposed adjacent the spunbond material 104 passing through the lamination station 106, while the non-heated soft roll 110 is disposed adjacent the meltblown material 102. The heated hard roll 108 of the lamination station 106 impresses a pattern of depressions 112 on the hot meltblown layer 102 (through the spunbond layer 104), with a mating pattern of projections on the hot meltblown layer 102 being formed where the heated hard roll 108 does not form depressions 112. The pattern is formed most clearly in the meltblown layer 102 which softens under the heat and pressure applied thereto and, if at all, less clearly in the spunbond layer 104. In the context of the present invention, in order to maintain the MVTR high, care must be taken to ensure that the temperature and pressure applied do not result in conversion of the meltblown layer 102 into an impermeable film.

The embossing serves at least two functions: first, to bond the spunbond/meltblown or spunbond/meltblown/spunbond layers 104/102 or 104/102/104 together into a laminate, generally designated 116, and prevent delamination thereof (which may be done with or without any patterning being imposed upon the materials passing therethrough), and, second, to impose an embossing pattern on the meltblown layer. Preferably the meltblown material 102 is of relatively small fiber size (relative to the spunbond material 104) so that it is substantially uniform and therefore uniformly accepting of the embossing. At least one of the heated spunbond materials 104 generally enters into the depressions formed in the meltblown 102 by embossing of the sandwich 100 passing through the laminating station 106. Thus, the pores of the meltblown 102 are filled in the laminating station by the heat-softened fibers of the spunbond 104.

The resulting sandwich material or embossed laminate 116 is aesthetically appealing (because of the patterns which may have been impressed thereon), resists delamination, and is thicker than any of the components by themselves. The laminate retains desirable barrier properties (e.g., a high MVTR) and, where desired, may have an enhanced strength (e.g., a strength suitable for envelopes). The meltblown and spunbond materials together contribute additional strength to the laminate.

Generally, the bonded portions of the meltblown and spunbond materials of the laminates 116 appear translucent, while the non-bounded portions appear opaque or white.

Figure 4:
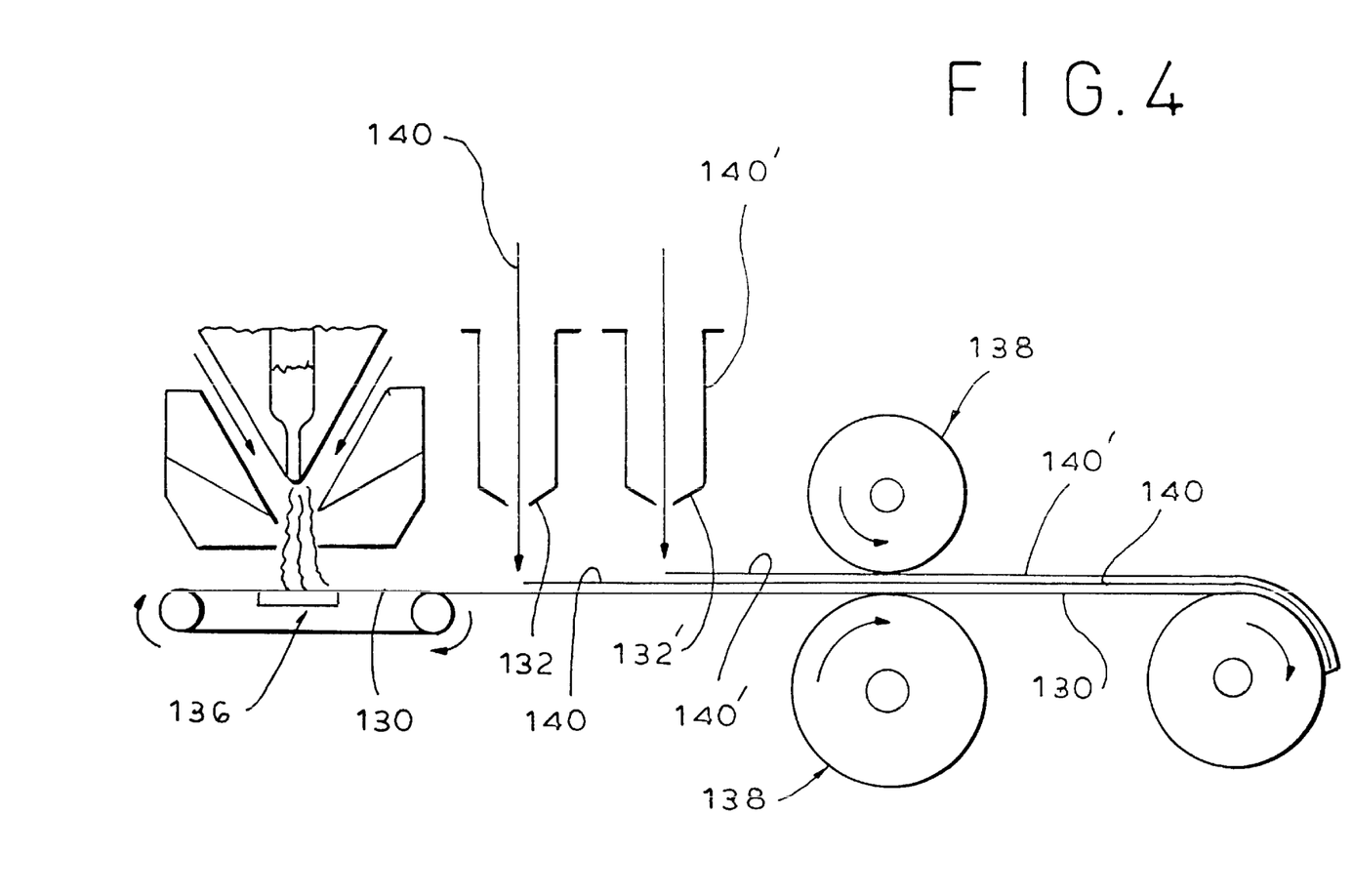
FIG. 4 is a schematic side elevational view of the process for adding addition materials to the main meltblown polymer at addition stations upstream of the compacting station.

Pertinent Parameters of the laminating or compacting station 138 include the temperature and pressure exerted on the laminate, the speed of the laminate, and the percentage bonding area of the laminate.

For backsheet applications relying on desirable barrier properties (e.g., a high MVTR), line pressures of 50–300 Newtons per millimeter (preferably 75), roll temperatures of 25–200° C. (preferably 100–128° C.) and speeds of 20—200 meters per minute (preferably 150) are preferred for laminates of about a 20 gsm (grams per square meter) compacted meltblown and about a 17 gsm spunbond, whether the same are made exclusively of polypropylene or polyester. As the basis weights increase, the speed should be lowered to compensate for the heat transfer effect by the sample at a given line pressure. It is also possible to run the laminate at a higher speed by using higher line pressure or halving a greater embossing depth for heavier fabrics. The percentage bonding area for the compacted fabric after lamination is preferably about 5–50%, lower percentage bonding areas being useful for back sheets (for example, 20% or less) and higher percentage bonding areas (for example, 20% or more) being useful for front sheets and the like.

For making, a Tyvek-type laminate of polypropylene, polyethylene terephthalate, polyethylene and their blends, generally the same operating conditions may be used albeit with both the hard roll and the soft roll being smooth—that is, without an embossing pattern. The same temperature and speed ranges are used, lout the pressure range is 50–600 Newton per millimeter (preferably 300).

Referring now to FIG. 4, in order to enable the compacted media 102 of the present invention to be economically formed of a polymer blend (as opposed to, say, 100% retain polymer, here polypropylene 130), in the second process modification at least one addition station 132 is disposed intermediate the station 136 where the meltblown is formed and quenched and the station 138 where it is compacted—i.e., intermediate the quenching station 136 and the compacting station 138. A hopper disposed at each addition station 132 releases heated (but unmelted) addition material 140 intended to be blended with the main polymer (here, polypropylene 130) from the quenching station 136. The subsequent compaction step at the compaction station 138 causes the addition material 140 ten bond and become integrated with the main polymer 130.

Preferred addition materials for use in the addition stations include polymers such as polyethylene, polyurethane and ethyl vinyl alcohol, these specific materials being preferred for their ability to contribute softness and elasticity to polypropylene. The addition material 138 released by the hopper of the addition station 132 may be in the form of a powder, paste, particulates, or staple fibers (the latter preferably being less than 4 denier). Also useful as addition materials for use in the addition stations 132 are fibers of a different diameter than the fibers leaving the quenching station 136. A plurality of different addition materials may be added at each addition station, if desired. Thus a second addition material 140' may be added to the main polymer/first addition material 130/140 at a second addition station 132'.

The use old the addition stations 132 avoids the need to separately process addition materials such as polyethylene and polyurethane, which are well recognized in the art as being difficult to employ in a production setting. A further advantage is that the use of separate addition stations 132 avoids the formation of the production line bottleneck which would otherwise occur if all of the addition materials 140 had to be blended with the main polymer 130 in a single hopper, a rather time-consuming operation. Furthermore, blending in a single hopper of the meltblown material 130 and any addition materials 140 could occur only if the meltblown material 130 and the addition materials 140 are miscible and have appropriately similar melting points.

It will be appreciated that the quenching step provides additional strength to the meltblown material 130 at an early stage, so that it is thereafter capable of receiving and supporting the addition materials 140. If it is desired to utilize the resultant material for its barrier property (e.g., high MVTR), the meltblown material 130 must undergo compacting. The addition material 130 added before compacting becomes incorporated into (and embedded within) the meltblown material 130, but typically it is not melted completely.

A fibrous material, such as a meltblown, useful as a cover or top sheet for fluid transport to an absorbent core, must be characterized by a high strikethrough of bodily fluids (which may be of different consistency and viscosity—e.g., urine, blood) from the body side to the absorbent core and preferably by less rewetting from the side of the absorbent core. The high strikethrough and typically lower rewetting is preferably accomplished by increasing and shaping the pore size in the direction of the desired liquid flow.

Figure 5A:
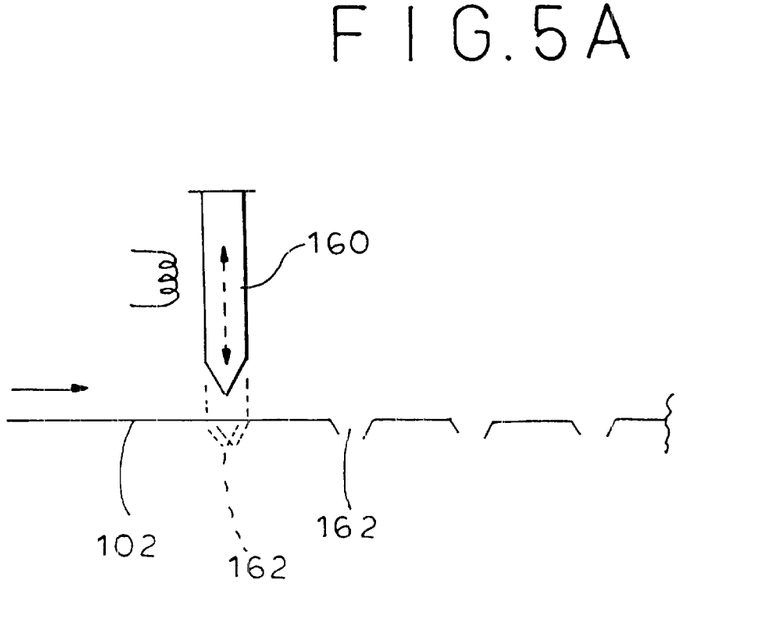
FIG. 5A is a fragmentary enlarged schematic sectional view showing penetration of a compacted meltblown material by a hot needle to perforate the same.

Referring now to FIG. 5A, in one preferred embodiment of the third process modification, the present invention both increases the pore size (to increase strikethrough) and shapes the pores (to reduce rewetting). This is achieved through post-compaction hot needle perforation, whereby the fibers of the compacted meltblown material 102 become plasticized after perforation with the pointed tip 160 of a hot needle to form a tapered perforation 162 and, after withdrawal of the needle point 160, the plasticized fibers freeze to stabilize the shape of the convergently tapered perforation 162 heading to the absorbent core. Optimally, hot needle perforation is performed asynchronously at two perforation stations so that the perforations formed by one station do not repeat, and preferably do not even overlap, the perforations performed at the other station. The process melts the open area of the perforations with holes of different hole shapes and diameters, preferably interfering with subsequent capillary action leading o rewetting. The compacted fibrous layer may preferably have a density of 10–25 gsm, according to the needles used.

Figure 5B:
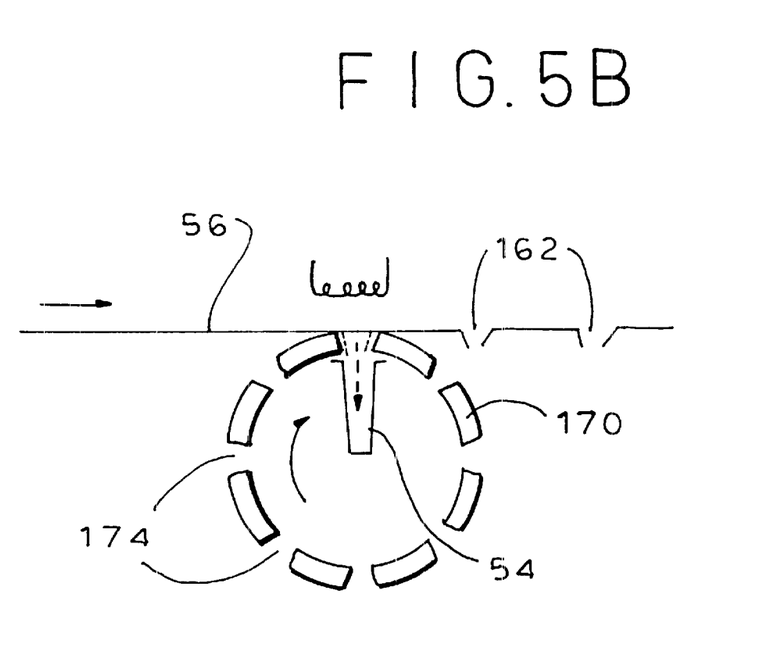
FIG. 5B is a fragmentary side elevational view showing the use of a perforated rotating screen on a section box to perforate the hot meltblown material prior to compaction.

Referring now to FIG. 5B, in another preferred embodiment of the third process modification, the suction box 54 used to draw the uncompacted molten polymer filaments 56 from the quenching station 136 may utilize a perforated rotating screen 170 and a high vacuum (suction) air stream 172. The suction causes the heated filaments to be sucked through the convergent screen perforations 174, thereby to form a pattern of three-dimensional trumpet-like or convergent perforations 162 in the uncompacted material.

In either case, a micro-relief surface is created which does not feel spongy or filmy, does not hold liquid and reduces resetting. The fibrous layer has small pores or perforations, which pass only low viscosity fluids and is soft to the feel and configuration. Because of the configuration of the perforations 162 formed, especially thy a hot pointed needle penetrating the fibrous layer, rewetting is minimized. (By way of contrast, perforation of a film does not preclude, or even minimize, rewetting.)

Compaction is not necessarily required, but preferably the perforation should take;place after compaction in order to keep the fibrous layer as thin and drapable as possible. The compaction prevents the fibrous layer from absorbing parts of the body fluid into itself (the latter causing a wet feeling after multiple flushes of body fluids).

Thus, the present invention provides a soft, smooth, drapable fibrous perforated layer of high fiber density, low porosity (and therefore breathable), and high abrasion resistance, the layer being characterized by accurately formed perforations (no matter how formed) and being especially useful for disposable diapers and various feminine hygiene products.

The materials of the present invention find utility in a wide variety of industrial application. For example, the materials are useful as filters for air filtration, car filters, liquid filters and filter bags. The materials are also useful in industrial protective clothing such as clean room apparel, commodity consumer clothing, dust protection and chemical protection. The materials are further useful as industrial wipes such as clean room wipes, oil absorption wipes, lens cleaning wipes, and surface protection for low friction and/or non-scratch surfaces. Other industrial applications for the materials include house wrapping, packaging, furniture and bedding, car covers, insulation, battery separators, shoe components and the like.

Further, the materials of the present invention find utility in a wide variety of hygiene applications. For example, the materials are useful as top sheets, backsheets or outer covers, leg cuffs, waistbands, stretch tabs, elastic or extendable side panels, and acquisition or distribution layers.

Finally, the materials of the present invention also find utility in a wide variety of medical applications. For example, the materials are useful as surgical drapes, surgical gowns, cut-in-place gowns, shoe covers, bouffant caps and sterilization wrapping.

The specification of particular applications hereinabove is to be taken as exemplary only, and not as limiting. Uses other than the aforenoted industrial, hygiene and medical applications follow naturally from the physical and chemical properties of the materials of the present invention.

The controlled porosity fabrics of the present invention are generally useful in each of the aforementioned industrial applications, hygiene applications and medical applications.

To summarize, the present invention provides a method of making a media of controlled porosity, preferably a media combining high vapor permeability and low liquid permeability, which method does not require a specialized polymeric in-put or the use of chemical binders, additives or coatings to provide the desired permeability. The present invention also provides material made by the aforesaid method, such material not producing noise during use, exhibiting cloth-like feel (hand), and being sufficiently economical to manufacture for use in disposable products.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

TABLE I

|  | Huggies/ Ultratrim | Huggies/ Supreme | Pampers/ Premium | Drypers/ Supreme | FQF |
|---|---|---|---|---|---|
| Hydrohead (mbar) | 110 | 72 | 192 | 69 | 164 |
| MVTR g/m$^2$/24 hrs | 1495.5 | 1944.1 | 1198.4 | 1046.8 | 4411 |
| MD Tensile (N) | 53.14 | 46.32 | 71.18 | 47.6 | 80.23 |
| CD Tensile (N) | 19.98 | 45.15 | 17.52 | 23.07 | 43.23 |
| MD Elong % | 30.4 | 53.6 | 107.13 | 52 | 40.85 |
| CD Elong % | 40.36 | 30.11 | 132.18 | 54.37 | 62.92 |

TABLE II

| Specimen | Hydrohead mbar | MVTR g/m² @ 24 hr | Air Permeability cfm |
|---|---|---|---|
| 1 | 59[A] | 4187 | 0.5 |
| 2 | 29[A] | — | 193 |
| 3 | 40[A] | — | 83 |
| 4 | 70[C] | 1148 | 36 |
| 5 | 8[C] | — | 1 |

Legend =
[A]Test head size 28 cm²
[B]Test head size 38 cm²
[C]Test head size 5 cm²

TABLE III

| Units Test Head Size | Hydrohead mbar 28 cm² | Air Permeability cfm 38 cm² | CD Tensile N | CD Elongation % | CD Modulus Mpa | MD Tensile N | MD Elongation % | MD Modulus Mpa |
|---|---|---|---|---|---|---|---|---|
| Sample 1* | 39.5 | 82.88 | 7.24 | 64.64 | 11.35 | 12.41 | 33.63 | 37.06 |
| Sample 2* | 28.5 | 193 | 3.95 | 65.18 | 5.20 | 6.87 | 40.18 | 15.86 |

*Average of four specimens. Test head size for hydrohead is 28 cm², and test head size for air permeability is 38 cm².

We claim:

1. A method of making a non-woven fibrous media combining high vapor permeability and low liquid permeability, the method comprising the steps of:
   (A) providing a non-woven meltblown fabric formed of fibers that have small polymer crystals therein of low heats of fusion and relatively larger polymer crystals therein of relatively higher heats of fusion, the fibers being formed of a polymer drawn and then prematurely crystallized by premature quenching with a stream of cold quench air immediately after drawing prior to completion of fiber formation to form both small polymer crystals therein of low heats of fusion and relatively larger polymer crystals therein of relatively higher heats of fusion, and then collected during fiber collection to form the fabric; and
   (B) calendering the fabric at a roll surface temperature of 25–110° C., a nip linear force of about 25–150 Newtons/mm, and a roll speed of up to about 200 meters/minute, the temperature, pressure and roll speed of the calendering operation being cooperatively selected to soften the small polymer crystals therein of low heats of fusion, but not the relatively larger polymer crystals therein of relatively higher heats of fusion, thereby to retain a high vapor permeability of at least about 1200 g/m² @24 h, while providing a low liquid permeability as measured by a hydrohead of at least about 10 millibars, through compaction, fiber shrinkage and contraction in the fibrous media;
   (C) forming a laminate of the calendered fabric and a non-woven; and
   (D) passing the laminate through an embossing station to impose a pattern of depressions and projections on the calendered fabric wherein the non-woven enters the depressions of the embossed calendered fibers.

2. The method of claim 1, wherein the laminating station includes a heated hard roll adjacent the non-woven and an unheated soft roll adjacent the calendered fabric.

3. The method of claim 1 wherein the calendered fabric retains after lamination a high MVTR and substantially no holes therein.

4. The method of claim 1 wherein the non-woven is a spunbond.

5. The method of claim 1 wherein the fibrous media has a narrow pore size distribution.

6. The method of claim 5 wherein the polymer is isotactic.

7. The method of claim 5 wherein the polymer is polypropylene.

8. The method of claim 5 wherein the polymer is a blend of polypropylene and polybutylene.

9. The method of claim 8 wherein the blend is 60–90% polypropylene and 10–40% polybutylene by weight.

10. The method of claim 5 wherein the polymer is isotactic polypropylene.

11. The method of claim 5 wherein the polymer exhibits a bell-shaped heat of fusion range distribution.

12. The method of claim 5 wherein the polymer is prematurely crystallized by quenching thereof prior to completion of fabric formation.

13. The method of claim 5 wherein the polymer combines high vapor permeability and low liquid permeability.

14. The method of claim 5 wherein the nonwoven fabric is a meltblown.

15. A non-woven fibrous media made by the method of claim 1 and being a component of a calendered laminate with a spunbond, said non-woven fabric having an embossed pattern of depressions and projections, with said spunbond entering the depressions of said non-woven fabric.

16. A method of making a non-woven fibrous media combining high vapor permeability and low liquid permeability, the method comprising the steps of:
   (A) providing a:non-woven meltblown fabric formed of fibers that have small polymer crystals therein of low heats of fusion and relatively larger polymer crystals therein of relatively higher heats of fusion, the fibers being formed of a polymer drawn and then prematurely crystaliized by premature quenching with a stream of cold quench air immediately after drawing prior to completion of fiber formation to form both small polymer crystals therein of low heats of fusion and relatively larger polymer crystals therein of relatively higher heats of fusion, and then collected during fiber collection to form the fabric; and
   (B) passing the prematurely crystallized fibers of the fabric through an addition station where at least one polymeric addition material is deposited on the fibers;
   (C) calendering the fabric at a roll surface temperature of 25–110° C., a nip linear force of about 25–150 Newtons/mm, and a roll speed of up to about 200 meters/minute, the temperature, pressure and roll speed of the calendering operation being cooperatively selected to soften the small polymer crystals therein of low heats of fusion, but not the relatively larger polymer crystals therein of relatively higher heats of fusion, thereby to retain a high vapor permeability of at least about 1200 g/m² @24 h, while providing a low liquid permeability as measured by a hydrohead of at least about 10 millibars, through compaction, fiber shrinkage and contraction in the fibrous media, and to integrate the fabric and the addition material.

17. The method of claim 16 wherein the fibers are polypropylene of a given diameter range, and the addition material is selected from the group consisting of polyethylene, polyurethane, ethyl vinyl alcohol, polypropylene of a different diameter range, and combinations thereof.

18. The method of claim 16 including the step of adding substantially each addition material at a respective separate addition station.

19. A non-woven fibrous media made by the method of claim 16 and including at least one polymeric addition material deposited on said fabric.

20. The media of claim 19 wherein said at least one polymeric addition material is deposited on said fabric before calendering.

21. The media of claim 19 wherein said at least one polymeric addition material is deposited on said fabric after calendering.

22. A method of making a non-woven fibrous media combining high vapor permeability and low liquid permeability, the method comprising the steps of:
(A) providing a non-woven meltblown fabric formed of fibers that have small polymer crystals therein of low heats of fusion and relatively larger polymer crystals therein of relatively higher heats of fusion, the fibers being formed of a polymer drawn and then prematurely crystallized by premature quenching with stream of cold quench air immediately after drawing prior to completion of fiber formation to form both small polymer crystals therein of low heats of fusion and relatively larger polymer crystals therein of relatively higher heats of fusion, and then collected during fiber collection to form the fabric; and
(B) calendering the fabric at a roll surface temperature of 25–110° C., a nip linear force of about 25–150 Newtons/mm, and a roll speed of up to about 200 meters/minute, the temperature, pressure and roll speed of the calendering operation being cooperatively selected to soften the small polymer crystals therein of low heats of fusion, but not the relatively larger polymer crystals therein of relatively higher heats of fusion, thereby to retain a high vapor permeability of at least about 1200 g/m$^2$ @24 h, while providing a low liquid permeability as measured by a hydrohead of at least about 10 millibars, through compaction, fiber shrinkage and contraction in the fibrous media; and
(C) creating spaced apertures in the calendered fabric and shaping the apertures in the calendered fabric so as to maximize strikethrough of bodily fluids and minimize rewetting.

23. The method of claim 22 wherein the increasing and shaping step comprises hot needle perforation of the calendered fabric such that insertion of the hot needle plasticizes the calendered fabric thereabout and, upon withdrawal of the hot needle, allows freezing of the plasticized calendered fabric.

24. A method of making a non-woven fibrous media combining high vapor permeability and low liquid permeability, the method comprising the steps of:
(A) providing a non-woven meltblown fabric formed of fibers that have small polymer crystals therein of low heats of fusion and relatively larger polymer crystals therein of relatively higher heats of fusion, the fibers being formed of a polymer drawn and then prematurely crystallized by premature quenching with stream of cold quench air immediately after drawing prior to completion of fiber formation to form both small polymer crystals therein of low heats of fusion and relatively larger polymer crystals therein of relatively higher heats of fusion, and then collected during fiber collection to form the fabric;
(B) utilizing a perforated rotating screen under suction to receive the fabric and form enlarged and shaped apertures therein to maximize strikethrough and minimize rewetting; and
(C) calendering the fabric at a roll surface temperature of 25–110° C., a nip linear force of about 25–150 Newtons/mm, and a roll speed of up to about 200 meters/minute, the temperature, pressure and roll speed of the calendering operation being cooperatively selected to soften the small polymer crystals therein of low heats of fusion, but not the relatively larger polymer crystals therein of relatively higher heats of fusion, thereby to retain a high vapor permeability of at least about 1200 g/m$^2$ @24 h, while providing a low liquid permeability as measured by a hydrohead of at least about 10 millibars, through compaction, fiber shrinkage and contraction in the fibrous media.

25. A non-woven fibrous media made according to the method of claim 24 and defining enlarged and shaped pores to maximize strikethrough and minimize rewetting.

26. A method of making a non-woven fibrous media combining high vapor permeability and low liquid permeability, the method comprising the steps of:
(A) providing a non-woven meltblown fabric formed of fibers that have small polymer crystals therein of low heats of fusion and relatively larger polymer crystals therein of relatively higher heats of fusion, the fibers being formed of a polymer drawn and then prematurely crystallized by premature quenching with stream of cold quench air immediately after drawing prior to completion of fiber formation to form both small polymer crystals therein of low heats of fusion and relatively larger polymer crystals therein of relatively higher heats of fusion, and then collected during fiber collection to form the fabric; and
(B) passing the prematurely crystallized fibers of the fabric through an addition station where at least one polymeric addition material is deposited on the fibers;
(C) calendering the fabric at a roll surface temperature of 25–110° C., a nip linear force of about 25–150 Newtons/mm, and a roll speed of up to about 200 meters/minute, the temperature, pressure and roll speed of the calendering operation being cooperatively selected to soften the small polymer crystals therein of low heats of fusion, but not the relatively larger polymer crystals therein of relatively higher heats of fusion, thereby to retain a high vapor permeability of at least about 1200 g/m$^2$ @24 h, while providing low liquid permeability as measured by a hydrohead of at least about 10 millibars, through compaction, fiber shrinkage and contraction in the fibrous media;
(D) creating apertures in the calendered fabric and shaping the apertures in the calendered fabric so as to maximize strikethrough of bodily fluids and minimize rewetting;
(E) forming a laminate of the calendered fabric and a non-woven; and
(F) passing the laminate through an embossing station to impose a pattern of depressions and projections on the calendered fabric wherein the non-woven enters the depressions of the embossed calendered fibers.

* * * * *